(No Model.)
W. P. YEOMAN.
WIRE FENCE LOOPER.
No. 431,222. Patented July 1, 1890.
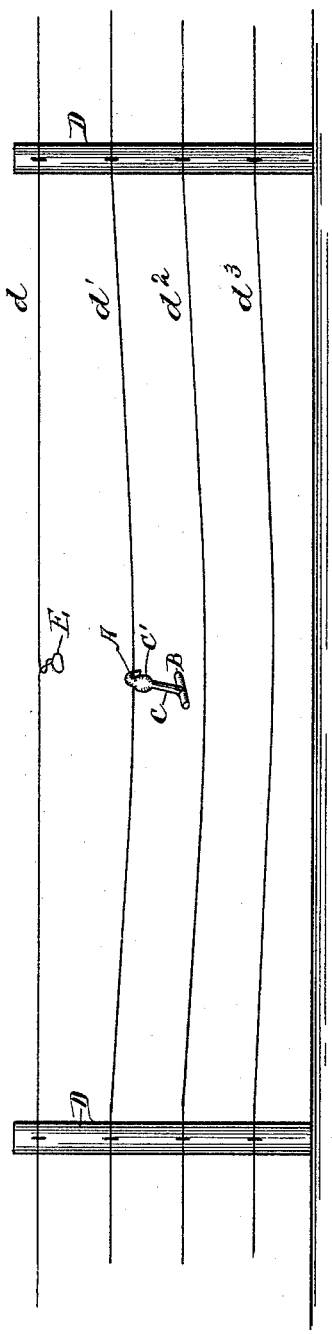
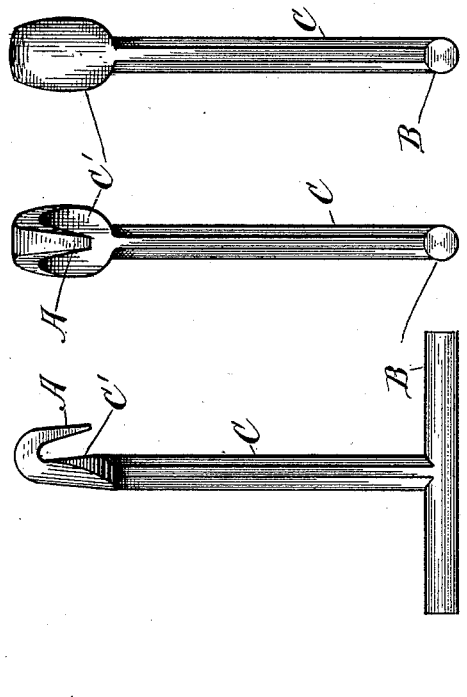
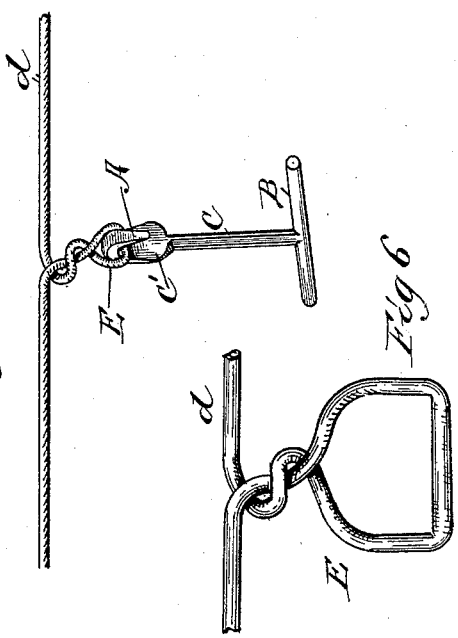
Witnesses
W. C. Corlies
W. J. Watts
Inventor
William P. Yeoman
By E. C. Crawford
Atty

UNITED STATES PATENT OFFICE.

WILLIAM P. YEOMAN, OF WAUKEGAN, ILLINOIS.

WIRE-FENCE LOOPER.

SPECIFICATION forming part of Letters Patent No. 431,222, dated July 1, 1890.

Application filed March 24, 1890. Serial No. 345,025. (No model.)

*To all whom it may concern:*

Be it known that I, WILLIAM P. YEOMAN, a citizen of the United States, residing at Waukegan, in the county of Lake and State of Illinois, have invented a certain new and useful Improvement in Wire-Fence Loopers, which is fully set forth in the following specification and the accompanying drawings.

It is found in the spring of the year, on account of alternate freezing and thawing, that some or all of the wires of a fence will sag. Especially is this true of the top one or two wires.

My invention relates to instruments used to tighten the sagging wires in wire fences.

The especial object of my invention is to provide a means of taking up such sag without removing or loosening the staples which secure the wires to the fence-posts.

My invention and the method of using it are illustrated in the accompanying drawings, in which—

Figure 1 is an elevation of a section of wire fence, showing some wires sagging—one having the looper attached to it ready for use, and another already tightened by using the looper. Fig. 2 shows a loop made in a wire with the looper not yet withdrawn from the loop. Fig. 3 is a side view of the looper shown by itself. Figs. 4 and 5 are respectively front and rear views of the same. Fig. 6 is a view of a loop especially designed to show the angles made in the wire by the edges of the looper.

Like letters refer to like parts throughout the several views.

Referring to the drawings, A represents the hook of the looper; B, its handle; C, the bar connecting the handle and the hook, and C' a shoulder on the bar. These parts are made of metal, and are preferably cast together as one, though they may be cast separately and be made so as to be fastened together by any suitable means.

D D are posts, and $d\ d'\ d^2\ d^3$ wires of a wire fence. The last three wires are shown as sagging.

E is a loop made in the wires by means of the looper.

The operative part of the looper is a hook of a peculiar form—namely, starting from a shoulder C' at the end of the connecting-bar, it curves till its pointed end extends toward the handle B, the curve being made wide enough to receive a fence-wire. The inner surfaces of the sections of the curve of the hook are made flat and as nearly parallel as possible. The opposite sides of the pointed section are also flat, and, starting from the adjacent inner surface, converge outward, and the outer surface of both sections of the hook tapers uniformly from its shoulder to its point. The hook being constructed thus, sharp edges are formed along its sides, and wire brought in contact with these edges may be bent at quite a sharp angle instead of in a curve. Such angles being made in the wire, the loop cannot be drawn out straight, but, being drawn, will become a "hard knot," practically. By virtue of the tapering form of the hook it can be easily withdrawn from a loop when the loop is finished.

In using the looper its hook is placed over a wire and its handle revolved two or three times. This may be repeated at different points in the wire till all the sag in a given section is taken up.

It is obvious that the work of tightening wires by this instrument can be done very rapidly. One can even do most of it on horseback, as it is the top wires that usually sag.

The handle of the hook is preferably placed on the connecting-bar at right angles to the inner faces of the hook, as it can be thus used most conveniently.

Having fully described my invention, what I claim as new, and desire to secure by Letters Patent of the United States, is—

1. A metallic hook tapering on its outer surface uniformly to its end, having the inner surfaces of its curve flat and the opposite sides of its pointed section converging outward, in combination with an operative handle, substantially as and for the purpose specified.

2. In a wire-fence looper, the combination of the handle B, the bar C, the shoulder C', and the hook A, formed with edges along its opposite sides and tapering from the shoulder C' to the end of said hook, substantially as and for the purpose specified.

WILLIAM P. YEOMAN.

Witnesses:
E. C. CRAWFORD,
F. C. BASSETT.